United States Patent [19]  [11] 4,152,998
Taylor  [45] May 8, 1979

[54] METHOD FOR FORMING SNAP-ACTING THERMALLY RESPONSIVE ACTUATORS

[76] Inventor: John C. Taylor, Edge Lee, Bishops Lane, Buxton, Derbyshire, England

[21] Appl. No.: 735,508

[22] Filed: Oct. 26, 1976

[30] Foreign Application Priority Data

Oct. 30, 1975 [GB] United Kingdom ............. 45023/75

[51] Int. Cl.² .................... B21D 53/00; H01R 9/00
[52] U.S. Cl. .................... 113/119; 29/421 R; 29/630 C; 73/378.3; 337/111; 337/379; 428/555
[58] Field of Search ............ 113/116 R, 119; 72/60, 72/702, 379, 349; 337/111, 379; 29/421 R, 195.5, 630 C; 73/378.3

[56] References Cited

U.S. PATENT DOCUMENTS

| 194,911 | 9/1877 | Hoeltge | 72/379 |
| 562,309 | 6/1896 | Leavenworth | 72/60 |
| 576,593 | 2/1897 | Lowry | 72/60 |
| 1,988,345 | 1/1935 | Vaughn | 73/378.3 |
| 3,196,233 | 7/1965 | Burch et al. | 337/111 |
| 3,221,126 | 11/1965 | Moro | 337/379 X |
| 3,234,346 | 2/1966 | Taylor | 337/111 |
| 3,943,625 | 3/1976 | Brenan | 113/119 X |

FOREIGN PATENT DOCUMENTS

239193  3/1969  U.S.S.R. .................... 72/702

Primary Examiner—Leon Gilden

[57] ABSTRACT

A method of forming a snap-acting thermally responsive bimetallic actuator comprising forming, from sheet bimetal, a member having an aperture with an arcuate outer perimeter and an inner perimeter defining a tongue free at one end, said free end being close to the outer perimeter, the outer and inner perimeters smoothly merging at rounded ends of the aperture adjacent the tongue root, and the radial width of the member at the tongue root being substantially greater than the width opposite the free end of the tongue. The formed member is thereafter pressed between a die shaped to a domed configuration and an incompressible rubber pad to impart a domed configuration to the member.

26 Claims, 9 Drawing Figures

Fig. 6

| Operating Characteristic | Batch | Median | Mode | Arithmetic Average | S Standard Deviation | % of a Large Batch that will be within:- | | | | |
|---|---|---|---|---|---|---|---|---|---|---|
| | | °C | °C | °C | °C | ±2°C | ±5°C | ±10°C | | |
| Operating Temperature | 1 | 132 | 132 | 133 | 5·22 | 29·0 | 65·0 | 95·0 | | |
| | 2 | 143 | 140 | 141 | 7·82 | 20·0 | 47·0 | 79·0 | | |
| | | °C | °C | °C | °C | ±2°C | ±5°C | ±10°C | | |
| Differential | 1 | 42 | 42 | 44 | 6·14 | 25·0 | 58·0 | 89·0 | | |
| | 2 | 43 | 43 | 43 | 7·70 | 19·0 | 48·0 | 79·0 | | |
| | | mm | mm | mm | mm | ±0·01 mm | ±0·025 mm | ±0·05 mm | | |
| Active Displacement | 1 | 0·57 | 0·57 | 0·57 | 0·026 | 30·0 | 67·0 | 95·0 | | |
| | 2 | 0·63 | 0·63 | 0·63 | 0·097 | 08·0 | 20·0 | 40·0 | | |

METHOD FOR FORMING SNAP-ACTING THERMALLY RESPONSIVE ACTUATORS

BACKGROUND OF THE INVENTION (1) Field of the Invention

This invention relates to a method and apparatus for making snap acting thermally responsive bimetallic actuators for use in actuating the switch contacts of thermally responsive electric switches such as cut-outs, circuit breakers and thermostats.

(2) Description of the Prior Art

One well known form of bimetallic actuator is a bimetallic disc of domed configuration which moves to an oppositely domed configuration with a snap action with changes in temperature. Such discs are simple and inexpensive to mass produce, the basic operation of forming the actuator being pressing a flat disc between a pair of complementary steel dies to a desired domed configuration. Some form of heat treatment may be provided such as subjecting the actuator to a high temperature to stabilise the operating characteristics of the actuator, particularly the operating temperature.

For a variety of reasons, such discs have not proved stable over many repeated operations nor can they consistently be mass produced to an accurately predetermined operating temperature, i.e. the yield in such mass production of discs having a particular operating temperature is low, typically 40–50% for discs with an operating temperature within $\pm 2\frac{1}{2}°$ C. of the desired operating temperature.

Another method of mass producing discs has been proposed employing fluid pressure instead of dies to deform a disc against a fixed stop, see British Patent Specifications Nos. 1027688, 1027689. The problem with such method, apart from practical difficulties in mass producing discs with such method, is that it is difficult accurately to impress a desired spherical deformation on the disc since the stop is not an accurate spherical abutment, which may cause kinking, and the relatively low fluid pressure against the natural resilience in the disc may result in a tendency of the disc to return a slight amount to its original shape when fluid pressure is released.

In copending U.S. application Ser. No. 639,856, filed Dec. 11, 1975 by the present applicant there is broadly disclosed and claimed a snap-acting thermally responsive bimetallic actuator comprising a member of sheet bimetal having an aperture with an arcuate outer perimeter and an inner perimeter defining a tongue free at one end, said free end being close to said outer perimeter, said outer and inner perimeters smoothly merging at rounded ends of the aperture adjacent the tongue root, an area of said member surrounding said tongue and in relation to which said tongue, at least in part, is generally centrally disposed having been deformed in a die pressing operation to conform in shape to a die of domed configuration, said domed area being such as to reverse its curvature with a snap action with change in temperature, and the width measured generally radially from the centre of said domed area of that part of the domed area in the region of the tongue root is substantially greater than the radial width of the part of said area generally opposite the free end of said tongue. In a preferred form such an actuator is domed overall and such preferred form of actuator will hereinafter be referred to as "an actuator as defined herein".

With the actuator as defined herein it has been found that a very much improved length of working life, stability of operating characteristics and accuracy in determining operating temperature is possible. Whilst such actuators could be mass produced by the methods outlined above it was preferred to develop a simple and inexpensive method of manufacture suitable for mass production which could realise to a greater extent the advantages inherent in such actuator.

SUMMARY OF THE INVENTION

The present invention provides in one aspect a method of manufacturing an actuator as defined herein, the method comprising (1) forming from sheet bimetal a member having an aperture with an arcuate outer perimeter and an inner perimeter defining a tongue free at one end, said free end being close to said outer perimeter, said outer and inner perimeters smoothly merging at rounded ends of the aperture adjacent the tongue root, said tongue being, at least in part, generally centrally disposed of said member and the width measured generally radially from the centre of the member of that part of the member in the region of the tongue root being substantially greater than the radial width of the part of the member generally opposite the free end of the tongue, and (2) pressing said member overall between a die shaped to a domed configuration and means acting as an incompressible fluid thereby to impart to said member a domed configuration conforming to said die such that said member reverses its curvature with a snap action with change in temperature.

In a further aspect the invention provides apparatus for manufacturing an actuator as defined herein comprising means for forming from sheet bimetal a member having an aperture with an arcuate outer perimeter and an inner perimeter defining a tongue free at one end, said free end being close to said outer perimeter, said outer and inner perimeters smoothly merging at rounded ends of the aperture adjacent the tongue root, said tongue being, at least in part, generally centrally disposed of said member and the width measured generally radially from the centre of the member of that part of the member in the region of the tongue root being substantially greater than the radial width of the part of the member generally opposite the free end of the tongue, and a press including a die shaped to a domed configuration engageable with means acting as an incompressible fluid for pressing said member overall.

By providing means acting as an incompressible fluid which adapts itself to the contours of said actuator member during a pressing operation but which provides resistance to allow the pressing operation to be effective, it has been found that more reliable results are had in obtaining accurately predetermined characteristics of the actuator as compared with the known method of forming between two steel dies, i.e. the yield in mass production of actuators having the desired characteristics is much higher. This may be explained by small dimensional inaccuracies in bimetal sheet thickness and mating steel dies (arising from imperfections in the machining and alignment of the dies) which create high local stress concentrations affecting the operating characteristics of an actuator, whereas means acting as an incompressible fluid adapts itself to any such dimensional inaccuracies and in consequence local stress concentrations are reduced. In addition, the thickness of the bimetal does not affect the accuracy of the pressing operation in accordance with the invention whereas with mating steel dies it is usually necessary to use the same dies with various thicknesses of bimetal which gives rise to inaccuracies in the mating of the dies.

Despite such increased reliability, the method and apparatus according to the invention are significantly cheaper and simpler than employing fluid pressure as described above. Such method and apparatus may also be more simple and less expensive than the known forming between two steel dies, since as described above it can be very difficult to provide two precisely mating and precisely aligned dies.

Said means acting as an incompressible fluid may comprise a well of incompressible fluid covered by a flexible diaphragm on which the actuator member can be seated. Alternatively and as preferred for simplicity and convenience, a solid material such as polyurethane rubber (Avothane (RTM)) may be provided. Whilst such rubber is preferred, it has been found in practice that during a die pressing operation rubber tends to extrude between the number and the wall of a container of the rubber in which the member is seated. The container is not significantly wider than the member in order closely to define the position of the member relative to a die. The extruded rubber between the member and the container wall makes it difficult to remove the member and leads to rapid break down of the rubber.

In a preferred form of apparatus according to the invention, this problem is reduced by positioning the rubber in a container having a base, sidewalls and a top, an aperture being formed in the top to receive the member and to closely define the position of the member relative to a die above the aperture. The sidewalls and top are movable relative to the base. The die, on moving downward, closely engages in the aperture and engages the member, and thereafter a shoulder of the die engages the top of the container so that further pressure of the die results in movement of the die, the container top and sidewalls as one thus applying pressure to the rubber surrounding the member. After the full pressing pressure has been exerted and the pressure is relaxed, the container top and sidewalls and the die move back as one. The advantage of this arrangement is that displacement of the rubber in the forming area occurring during pressing is accommodated by movement of the rubber over the whole cross section of the container and abrasion of the rubber in the forming area is substantially reduced.

The container may be movable between differently shaped dies so that a member may undergo various die pressing operations without being moved from the container. In particular the member preferably initially undergoes a reverse doming operation prior to being impressed with the desired domed configuration, by which is meant a pressing operation in which the member is domed in the opposite direction to its desired final domed configuration. This operation is important in imparting to the member the differential between operating temperatures for increasing and decreasing ambient temperatures.

The member may also be pressed, prior to reverse doming, with a flat die in order to remove any initial curvature in the member; this may improve the yield of the method.

According to a preferred feature of the invention it has been found that after the die pressing operation on said bimetallic member but before temperature induced snap action thereof the characteristics of the actuator can be stabilised merely by mechanically reversing the curvature of the member by deflecting its one domed configuration through its central unstable position to its oppositely domed configuration.

This may be carried out by hand or by mechanical means. After the pressing operating it has been found the first snap-action operation of the member is considerably different to subsequently operations; the operating temperature is often 50° C. higher than in subsequent operations. By performing the first snap-action mechanically rather than by thermal cycling as the prior art, the finished actuator has been found to have more stable operating characteristics.

It has been found that the precise distance moved by the actuator during the mechanical reversal significantly affects the subsequent operating characteristics; there is thus provided in addition to adjusting the press dome radius, a means of accurately predetermining the operating characteristics.

The pressure exerted in the pressing operation also influences the operating characteristics of the actuator, and it is possible to accurately predetermine the characteristics of the actuator by accurately adjusting the pressure.

A particular advantage of the present invention arises when it is desired the actuator should carry an electrical contact, or perhaps a mounting boss. Previously such contact or boss has been welded or rivetted to an actuator after formation of the actuator. This introduces stresses into the bimetal affecting the operating characteristics and it is therefore necessary to calibrate the actuator after the application of the contact or boss. It is possible with the present invention to apply an electrical contact or mounting boss to the member prior to the pressing operation imparting the desired domed configuration, and positioning the member with the contact or boss face down against said incompressible fluid means so that said incompressible fluid means can move during the pressing operation to accomodate the contact or boss without affecting the formation of the desired domed configuration and thus without affecting the desired operating characteristics.

BRIEF DESCRIPTION OF THE DRAWING

A preferred embodiment of the invention will now be described with reference to the accompanying drawings wherein.

Figures 1, 2, 5:
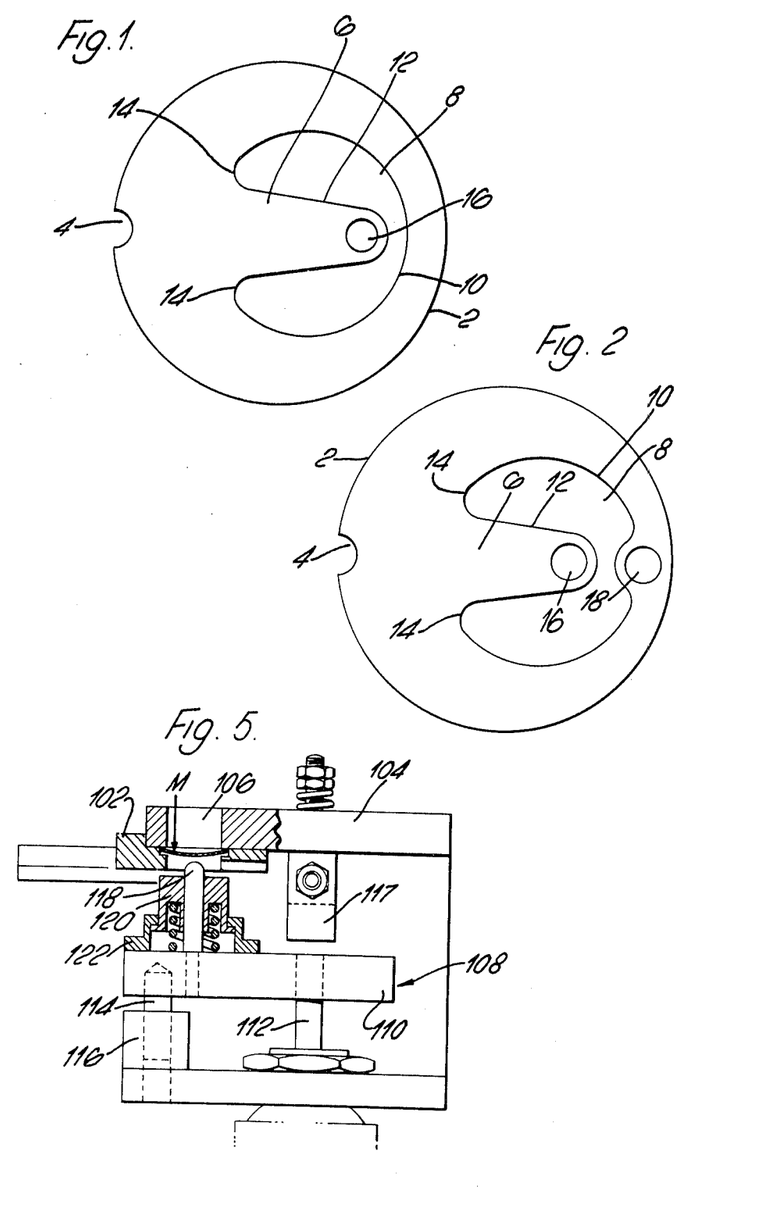
FIGS. 1 and 2 are plan views of preferred forms of an actuator as defined herein to which the method of the present invention may be applied.
FIG. 5 is a sectional view of a preferred apparatus for inducing a first mechanical reversal of the curvature of the actuator.

DESCRIPTION OF THE PREFERRED EMBODIMENTS:

In FIG. 1 an actuator as herein defined comprises a member of 0.3 mm thick bimetal and has a spherical curvature imparted over its entire surface. The member has a circular periphery 2 with a diameter of 18.3 mm and has a semicircular locating recess 4 in the periphery. The member has a tongue 6 at least in part centrally disposed of the member formed by an aperture 8 with an arcuate outer perimeter 10 and an inner perimeter 12 defining tongue 6 and smoothly merging with perimeter 10 at rounded ends 14. Tongue 6 tapers with a 15° taper from a wide tongue root and is about 13 mm long. The end of the tongue has a hole 16 for mounting the actuator. The radial width of the parts of the member surrounding the tongue reduce progressively from a maximum at the tongue root (6 mm) to a minimum (3 mm) opposite the free end of the tongue. When the actuator is heated, it snap-acts at a predetermined operating temperature to an oppositely domed configuration.

In FIG. 2, the actuator herein defined is generally similar to that shown in FIG. 1 but is intended for use in a contact breaker sensitive to excess currents flowing therethrough. Parts similar to those of FIG. 1 are denoted by the same reference numerals. The actuator of FIG. 2 carries an electrical contact 18 welded to the periphery opposite the free end of tongue 6. The periphery of the actuator on either side of contact 18 is substantially narrowed as compared with the corresponding parts in FIG. 1 in order to increase the electrical resistance and hence the sensitivity of the actuator to current flow therethrough.

Figure 3:
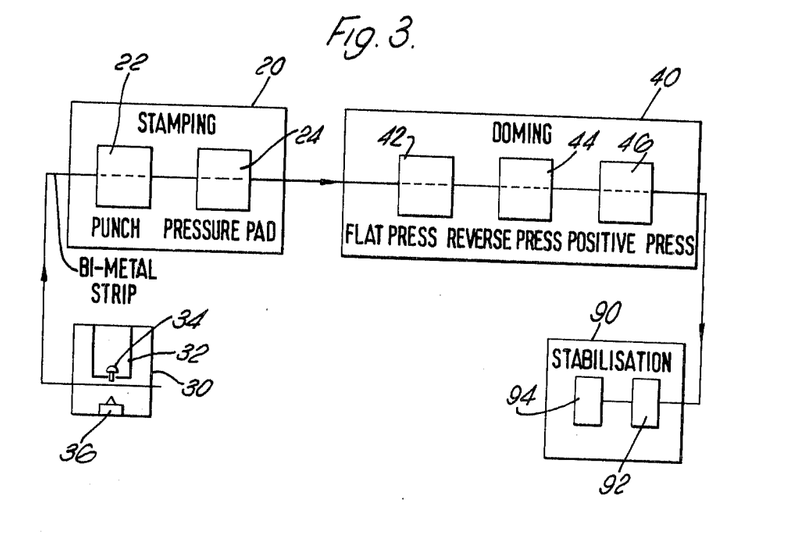
FIG. 3 is a block diagram of a method of forming an actuator including the die pressing method according to the invention.

In the preferred method of the invention as indicated schematically in FIG. 3, bimetal in the form of a strip is continuously fed from a roll of strip material to a stamping station 20. A punch 22 having the shape of the member shown in FIG. 1 or 2 stamps out the member shape from the bimetal with the tongue of the member pointing along the length of the strip so that internal stress lines, which invariably occur along the length of the strip, run along the length of the tongue and do not interfere with the operation of the actuator.

After punching, the member is pressed back into the strip with a pressure pad 24. This is a conventional operation, but it is particularly desirable with the present invention since the member can be transported in the strip for further processing and thereby kept in the desired orientation.

If it is desired to mount an electrical contact to the actuator, as shown in FIG. 2, the contact is applied prior to the punching operation by a rivetting machine indicated schematically at 30. The machine includes a holder 32 for a rivet 34 and a punch 36 for penetrating the bimetal strip and rivetting the rivet to the strip. As an alternative to rivetting the contact may be spot welded to the strip.

The punched out members are transported in the strip to a doming station 40 where a predetermined domed configuration is imparted to provide the desired temperature responsive characteristics. The station comprises three hydraulic presses in which the member is successively pressed, the first press 42 having a flat die for removing any curvature in the member, the second press 44 imparting a reverse domed configuration and the third press 46 imparting the desired domed configuration. It has been found that the operation of reverse doming is highly desirable since it removes small stresses and deformations that may be present in the actuator arising from the punching operation. In addition to reverse doming "stretches" the bimetal, i.e. produces irreversible movement and stress between the two layers of the bimetal, which to a considerable extent determines the differential between the operating temperatures of the actuator for increasing and decreasing temperatures.

In the doming station, the member M is located in a dolly 48 (FIG. 4) which is transportable between hydraulic press 42 having a flat die 50, hydraulic press 44 having a die 52 for reverse doming the member and hydraulic press 46 having a die 54 for positively doming the member. The dolly comprises a container having a base 60, sidewalls 62 and a top 64. The top 64 has a circular aperture 66 therein in which the member M closely fits. The container houses a pad 68 of synthetic rubber, Avothane (RTM), which acts in a pressing operation as an incompressible fluid. The top 64 and sidewalls 62 are integral with each other and are slidable up and down relative to base 60.

Figure 4:
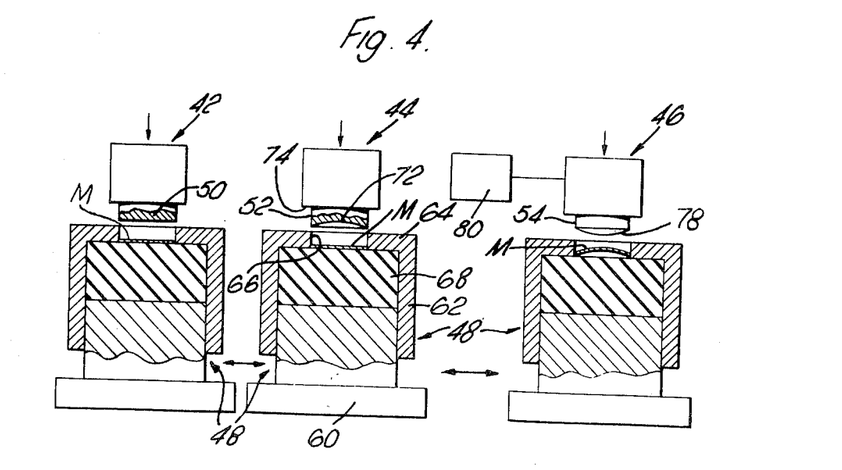
FIG. 4 is a sectional view of a preferred press for doming the actuator.

Reverse doming die 52 has a face 72 having a desired spherical curvature. In a pressing operation die 52 moves downward so that face 72 closely fits within aperture 66 and face 72 contacts the member M.

On further downward movement, a shoulder 74 of die 52 contacts container top 64 so that when the full press pressure is exerted, the die 52, top 64 and sidewalls 62 move down as one relative to base 60 and pad 68. Pad 68 acts as an incompressible fluid and provides the necessary resistance to impart the desired configuration to the member M. Movement of the rubber during the pressing operation to accomodate the shape of the die and as a result of any slight compression that may occur in the rubber, is spread over the whole cross-section of the container and thus breakdown of the rubber due to excessive extrusion in the forming area does not occur. When a predetermined pressure has been exerted on member M, the face 72 is retracted.

Member M is left in the dolly, and the dolly is transported to the positive doming press 46. Die 54 has a face 78 having a desired positive spherical curvature for imparting the desired domed configuration to member M. The member M is positively domed by press 46, the pressing operation being carried out in the same way as described above and with a predetermined pressure being applied to the member by means 80.

By employing the rubber pad 68, it has been found more reliable results are had in obtaining accurately predetermined characteristics of the actuator as compared with the known method forming between two steel dies. This may be explained at least in part by small dimensional inaccuracies in the forming and alignment of dies and inaccuracies in bimetal sheet which create high local stress concentrations affecting the operating characteristics of the actuator, whereas a rubber pad acting as an incompressible fluid adapts itself to any such dimensional inaccuracies and in consequence local stress concentrations are reduced. In addition pressure fluctuations during the pressing operation are effectively reduced by half as compared with pressing between steel dies.

As an additional step in order to reduce any initial curvature of the bimetal, a die 42 with a flat tip 50 is provided to press the member M flat in the dolly 48 prior to the doming operations.

It is preferred to accurately control the ambient temperature to within ±2° C. during the pressing operations in order to ensure accurately predetermined operating characteristics.

After pressing, the actuator is passed to a stress relieving station 90 which relieves unstable stress in the actuator to improve the subsequent stability of the actuator. In the station 90, the member M is mechanically inverted to an oppositely domed configuration with the apparatus as shown in detail in FIG. 5. This mechanical inversion is found to provide significant stabilisation. Referring to FIG. 5, the member M (with its convex side down) is held in a holder 102 movable to a position as shown beneath and engaging with a fixedly mounted support plate 104 having a circular bore 106 of a diameter slightly smaller than that of the member M. A plunger assembly 108 disposed below support plate 104 comprises a plate 110 movable in a vertical direction and connected to the piston 112 of an air cylinder. A rod 114 is provided slidable in a bore 116 for guiding plate 110. An adjustable stop 117 is provided for accurately determining the upward movement of plate 110 and hence assembly 108. Directly below bore 106 is disposed a plunger 118 fixed to plate 110 and mounted in a tubular body 120 spring biassed towards plate 104. Body 120 is slidable in a vertical direction and is retained in a base member 122.

Figure 7:
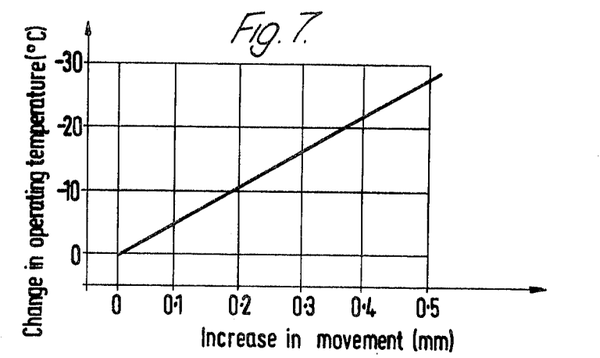
FIGS. 7, 8 and 9 are graphs illustrating the dependence of operating temperature of the actuator on various perameters of the method of formation.

In use, a member M is inserted in holder 102, and the holder is moved to the position shown engaging support plate 104 with the actuator positioned below bore 106. Piston 112 is then actuated to move assembly 108 upwards whereby plunger 118 engages the centre of the member M. As assembly 108 continues to move upwards the actuator is deformed in an upward direction through its central unstable position to an oppositely domed configuration. During this movement, body 120 engages the holder 102 to retain the holder in position. It has been found that the precise distance through which the member M is moved during the inversion affects the subsequent operating temperature of the actuator; in other words the subsequent operating temperature of the actuator is highly sensitive to the amount of movement in this first mechanical inversion. For this reason, adjustable stop 117 is provided to precisely limit the upward movement of plunger assembly 108. Referring to FIG. 7 there is shown the dependence of the subsequent operating temperature of the actuator upon the degree of movement in the mechanical inversion operation. It may be seen that for an increase in the movement of 0.5 mm of assembly 108 the operating temperature decreases by as much as about 30° C. Thus it is possible to exert an accurate control on the operating temperature of the actuator by means of the mechanical inversion step.

Figure 8:
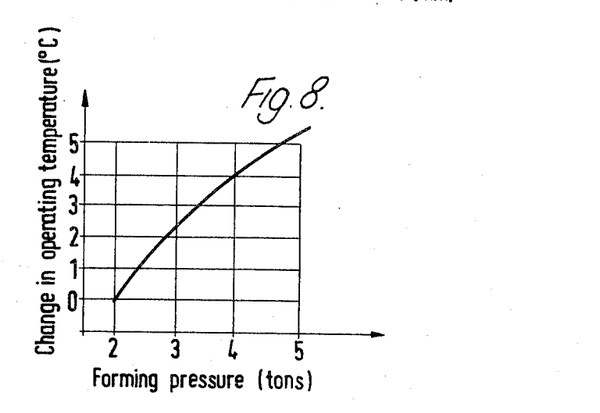

Whilst not as sensitive as mechanical inversion, it has been found that the pressure exerted during the pressing operation also influences the subsequent operating characteristics of an actuator as defined herein. It may therefore be desirable to exert an accurately predetermined pressure during pressing operations, particularly the final positive doming pressing operation. Referring to FIG. 8, a change in the forming pressure in the final doming pressing operation from 2 tons to 5 tons produces an increase in operating temperature of about 5° C. Fluctuations in pressure of the order of 100 pounds such as commonly occur in pressing operations do not significantly affect the operating temperature.

Figure 9:
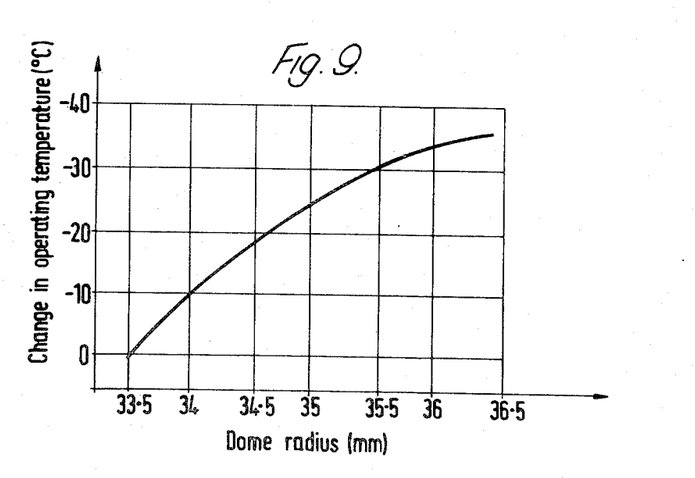

The press dies for the doming operations can be manufactured by conventional tooling techniques to form a series of domes in 0.1 mm steps in changing radius of curvature to provide close control over the desired operating temperature. Referring to FIG. 9 it can be seen that a change in dome radius from 33.5 mm to 36.5 mm produces a decrease in the operating temperature of the actuator of roughly 35° C.

Hence it may be seen that by proper selection of the dome radius and with close control over the distance of travel in mechanical inversion and also desirably control over the forming pressure, it is possible to provide for a continuous adjustment of the operating temperature and a very close control over the operating temperature.

Such control is also possible over the other operating characteristics of the actuator, although it is not thought necessary to describe this in detail.

After mechanical inversion the actuator may, if desired be subjected to heat treatment at 94 for a short period of time for further stabilisation, as by dipping the actuator in an oil bath at 250° C. for a few seconds and degreasing, or by heating the actuator in hot air or in a fluidised bath.

Tests have been carried out to show the advantages of the method according to the present invention of manufacturing an actuator as defined herein over a conventional method of doming between two steel dies.

A first batch of 100 actuators as defined herein were formed having a diameter of 18.3 mm and a thickness of 0.3 mm from bimetal having the high expansion layer composed of 22% nickel and 3% chromium and the remainder iron, and the low expansion layer composed of 36% nickel and the remainder iron, and subjected to an initial heat treatment of 250° C. for 30 minutes. The actuators were pressed as described above with reference to FIG. 4. The actuators were mechanically stabilised as described with reference to FIG. 5 and then for further stabilisation the actuators were heat cycled 6 times for 10 seconds at 200° C.

A second batch of 100 actuators as defined herein were formed with the same dimensions and the same bimetal and subject to the same initial heat treatment as the first batch. The second batch were pressed between a pair of steel dies and were then heated to 250° C. for 4 hours for stabilisation. Finally the actuators were cycled 5 times for 30 seconds at 150° C. Thus the second batch were formed by the known conventional procedure employed for manufacturing bimetallic discs.

Figure 6:
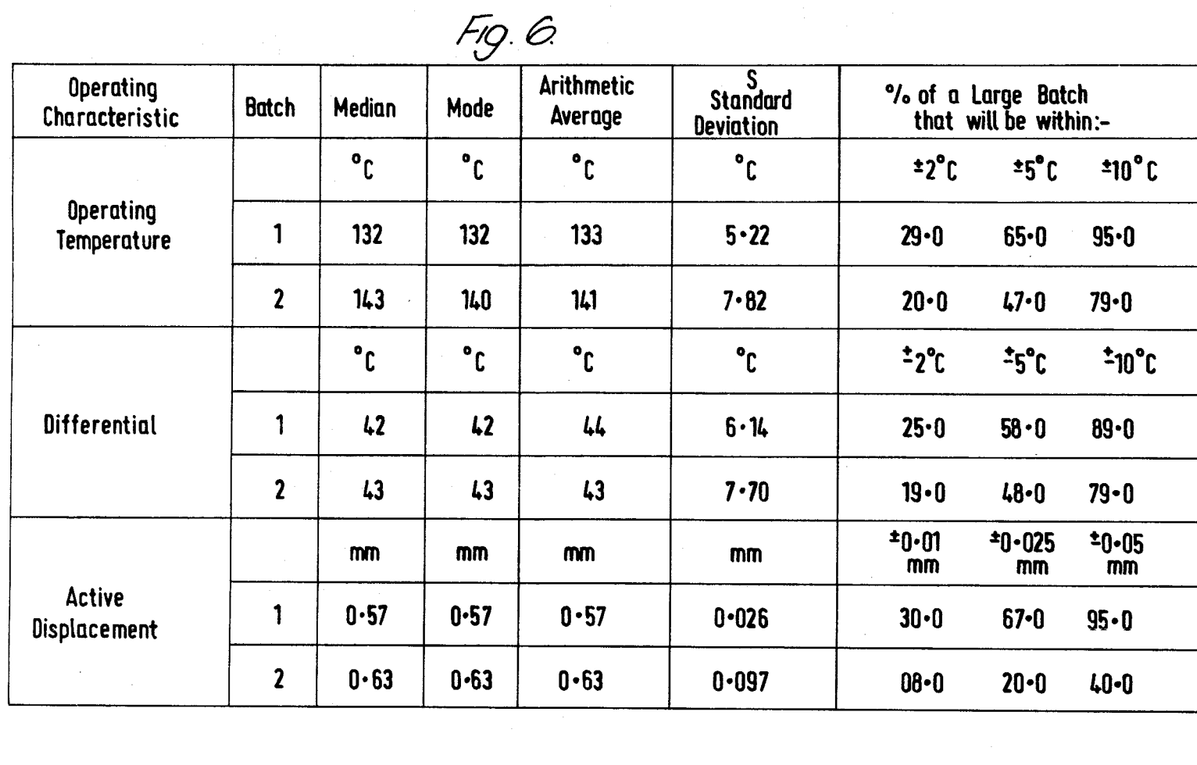
FIG. 6 is a table showing the results of comparative manufacturing yield tests.

The table of FIG. 6 compares yield for the two batches for operating temperature, differential and active displacement of the free end of the tongue during a snap-action movement. The active displacement was that occuring during a snap action movement and making due allowance for creep movement on either side of the snap-action movement against a nominal force of 5 gwt. It may be seen from the table of FIG. 6 the yield figures for batch 2 are significantly worse in all respects than those for FIG. 1.

The yield figures will in general be dependent on the operating temperature, the higher the operating temperature the lower the yield for any particular operating characteristic. Thus for example the yield figures of an operating temperature of 100° C. would be substantially higher than those given in FIG. 6.

What is claimed is:

1. A method for the manufacture of a thermally responsive actuator comprising the steps of:
    forming an apertured member from a bimetallic sheet the aperture in the member having an arcuate outer perimeter and an inner perimeter, the inner perimeter of the aperture defining a tongue free at one end, the free end of the tongue being juxtapositioned to the outer perimeter of the aperture and the inner and outer aperture perimeters smoothly merging at rounded ends of the aperture adjacent the root of the tongue, th tongue being at least in part generally centrally disposed with respect to the member and the width of that part of the member located in the region of the tongue root measured generally radially from the center of the member being substantially greater than the radial width of the part of the member disposed generally opposite the free end of the tongue;

subjecting the formed apertured member to an initial shaping operation, said initial shaping operation including pressing the member between a die shaped to a domed configuration and an element which acts as an incompressible fluid, said initial shaping operation imparting a contour to the member which extends from the initial plane of the member in a direction which is the reverse of the desired final shape; and subjecting the member to a further shaping operation, said further shaping operation including pressing said initially shaped member between a die shaped into a domed configuration and an element which acts as an incompressible fluid, said further shaping operation causing the member to conform to the die whereby the member will reverse its curvature with a snap action with a predetermined change in temperature.

2. The method of claim 1 further comprising the step of:

pressing the member between a flat die and an element which acts as an incompressible fluid prior to said initial shaping operation.

3. The method of claim 1 wherein said shaping steps each include:

pressing the member between a die and a rubber pad.

4. The method of claim 3 further comprising:

applying pressure to the rubber pad surrounding the member during the forming steps.

5. The method of claim 1 further comprising the step of:

mounting electrical contact means on the member prior to said initial shaping step.

6. A method as claimed in claim 1 wherein said member is mounted in a container containing means acting as an incompressible fluid, and said container is moved between said dies to perform said shaping operations.

7. A method for the manufacture of a bimetallic actuator comprising the steps of:

feeding a strip of bimetallic material to a stamping station;

stamping the bimetallic strip to produce a member having an aperture with an arcuate outer perimeter and an inner perimeter, the inner and outer perimeters of the aperture defining a tongue free at one end, the free end of the tongue being close to said outer perimeter, the outer and inner perimeters smoothly merging at rounded ends of the aperture adjacent the root portion of the tongue, the tongue being at least in part generally centrally disposed of the member and the width measured generally radially from the center of the member to that part of the member in the region of the tongue root being substantially greater than the radial width of that part of the member disposed generally opposite the free end of the tongue, said members being severed from said strip;

pressing the member back into the bimetallic strip; and forming the member to a domed configuration, said forming step comprising pressing the member between a die shaped to a domed configuration and an element which acts as an incompressible fluid to thereby impart to the member a domed configuration which corresponds to the shape of the die whereby the member reverses its curvature with a snap action with a predetermined change in temperature.

8. A method for the manufacture of a thermally responsive actuator comprising the steps of:

forming an apertured member from a bimetallic sheet, the aperture in the member having an arcuate outer perimeter and an inner perimeter, the inner perimeter of the aperture defining a tongue free at one end, the free end of the tongue being juxapositioned to the outer perimeter of the aperture the inner and outer aperture perimeters smoothly merging at rounded ends of the aperture adjacent the root of the tongue, the tongue being at least in part generally centrally disposed with respect to the member and the width measured generally radially from the center of the member of that part of the member located in the region of the tongue root being substantially greater than the radial width of the part of the member disposed generally opposite the free end of the tongue;

pressing the member between a die shaped to a domed configuration and an element which acts as an incompressible fluid to thereby impart to the member a domed configuration; and mechanically reversing the curvature of the member.

9. The method of claim 8 wherein said step of mechanically reversing the curvature of the member comprises:

mounting the member in a holder; and contacting the member with a plunger to cause the curvature thereof to reverse.

10. The method of claim 8 further comprising the step of:

adjusting the distance through which the member moves during the step of mechanically reversing the curvature thereof to select the subsequent operating temperature of the actuator.

11. The method of claim 1 further comprising the set of:

adjusting the pressure applied to the member during the shaping operations to thereby determine the operating temperature of the actuator.

12. The method of claim 8 further comprising the step of:

adjusting the pressure applied to the member during the pressing operation to thereby determine the operating temperature of the actuator.

13. A method of manufacturing a thermally responsive bimetallic snap-acting actuator comprising:

forming from sheet bimetal a member having an aperture with an arcuate outer perimeter and an inner perimeter defining a tongue free at one end, said inner perimeter and arcuate portions of said outer perimeters smoothing merging at rounded ends of the aperture adjacent the tongue root, said tongue being, at least in part, generally centrally disposed of said member, the width of the area surrounding said tongue measured radially from the center of the member being greatest in the region of the tongue root;

pressing the overall member between a die shaped to a dome configuration and means acting as an incompressible fluid to thereby impart to said member a dome configuration conforming to said die and extending in the reverse direction to the desired final member shape; and pressing the overall member between a die shaped to a dome configuration and means acting as an incompressible fluid to thereby impart to said member a dome configuration conforming to said die and extending in said desired whereby said member will reverse its curvature with a snap-action with change in temperature.

14. A method according to claim 13 wherein prior to said reverse pressing operation, said member is pressed between a flat die and means acting as an incompressible fluid.

15. A method according to claim 13 wherein said member is mounted in a container containing means acting as incompressible fluid, and said container is moved between said dies to perform said shaping operations.

16. A method according to claim 13 wherein said means acting as an incompressible fluid comprises a rubber pad.

17. A method according to claim 16 wherein during said pressing operation on said member, pressure is also applied to said rubber pad surrounding said member.

18. A method according to claim 13 wherein an electrical contact is applied to said member prior to said pressing operation, and said member is disposed on said incompressible fluid means with the contact face down for said pressing operation.

19. A method according to claim 13 and including the step of adjusting the pressure in said pressing operation to thereby determine the subsequent operating temperatures of the actuator.

20. A method of manufacturing a thermally responsive bimetallic snap-acting actuator comprising:

stamping from a strip of bimetallic material a member having an aperture with an arcuate outer perimeter and an inner perimeter defining a tongue free at one end, said inner perimeter and arcuate portions of said outer perimeter smoothly merging at rounded ends of the aperture adjacent the tongue root, said tongue being, at least in part, generally centrally disposed of said member, the width of the area surrounding said tongue measured radially from the center of the member being greatest in the region of the tongue root;

pressing the formed member back into the strip of bimetallic material whereby the member is carried by the strip; and pressing the overall member carried by the bimetallic strip between a die shaped to a dome configuration and means acting as an incompressible fluid to thereby impart to said member a dome configuration conforming to said die such that said member reverses its curvature with a snap-action with change in temperature.

21. A method of manufacturing a thermally responsive bimetallic snap-acting actuator comprising:

forming from sheet bimetal a member having an aperture with an arcuate outer perimeter and an inner perimeter defining a tongue free at one end, said inner perimeter and arcuate portions of said outer perimeter smoothly merging at rounded ends of the aperture adjacent the tongue root, said tongue being, at least in part, generally centrally disposed of said member, the width of the area surrounding said tongue measured radially from the center of the member being greatest in the region of the tongue root;

pressing the overall member between a die shaped to a dome configuration and means acting as an incompressible fluid to thereby impart to said member a dome configuration conforming to said die such that said member may reverse its curvature with a snap-action with changes in temperature; and mechanically reversing the curvature of the pressed member prior to temperature induced snap-action thereof.

22. A method according to claim 21 wherein said mechanical reversal is carried out with a plunger assembly acting on the member while mounted in a holder.

23. A method according to claim 21 including the step of adjusting the distance said member moved during said mechanical reversal to thereby determine the subsequent operating temperature of the actuator.

24. A method for the manufacture of a thermally responsive actuator comprising the steps of:

forming an apertured member from a bimetallic sheet the aperture in the member having an arcuate outer perimeter and an inner perimeter, the inner perimeter of the aperture defining a tongue free at one end, the free end of the tongue being juxtapositioned to the outer perimeter of the aperture and the inner and outer aperture perimeters smoothly merging at rounded ends of the aperture adjacent the root of the tongue, the tongue being at least in part generally centrally disposed with respect to the member and the width of the area surrounding the tongue measured generally radially from the center of said area being greatest in the region of the tongue root;

subjecting the formed apertured member to an initial shaping operation, said initial shaping operation including pressing the member between a die shaped to a domed configuration and an element which acts as an incompressible fluid, said initial shaping operation imparting a contour to the member which extends from the initial plane of the member in a direction which is the reverse of the desired final shape; and subjecting the member to a further shaping operation, said further shaping operation including pressing said initially shaped member between a die shaped into a domed configuration and an element which acts as an incompressible fluild, said further shaping operation causing the member to conform to the die whereby the member will reverse its curvature with a snap-action with a predetermined change in temperature.

25. A method for the manufacture of a bimetallic actuator comprising the steps of:

feeding a strip of bimetallic material to a stamping station;

stamping the bimetallic strip to produce a member having an aperture with an arcuate outer perimeter and an inner perimeter, the inner and outer perimeters of the aperture defining a tongue free at one end, the free end of the tongue being close to said outer perimeter, the outer and inner perimeters smoothly merging at rounded ends of the aperture adjacent the root portion of the tongue, the tongue being at least in part generally centrally disposed of the member and the width of the area surrounding the tongue measured generally radially from the center of said area being greatest in the region of the tongue root, said members being severed from said strip;

pressing the member back into the bimetallic strip; and forming the member to a domed configuration, said forming step comprising pressing the member between a die shaped to a domed configuration and an element which acts as an incompressible fluid to thereby impart to the member a domed configuration which corresponds to the shape of the die whereby the member reverses its curvature with a snap-action with a predetermined change in temperature.

26. A method for the manufacture of a thermally responsive actuator comprising the steps of:

forming an apertured member from a bimetallic sheet, the aperture in the member having an arcuate outer perimeter and an inner perimeter, the inner perimeter of the aperture defining a tongue free at one end, the free end of the tongue being juxapositioned to the outer perimeter of the aperture the inner and outer aperture perimeters smoothly merging at rounded ends of the aperture adjacent the root of the tongue, the tongue being at least in part generally centrally disposed with respect to the member and the width of the area surrounding the tongue measured generally radially from the center of said area being greatest in the region of the tongue root;

pressing the member between a die shaped to a domed configuration and an element which acts as an incompressible fluid to thereby impart to the member a domed configuration; and mechanically reversing the curvature of the member.

* * * * *